United States Patent
Lin

(10) Patent No.: US 11,496,319 B2
(45) Date of Patent: Nov. 8, 2022

(54) METHOD OF IDENTITY AUTHENTICATION FOR VOICE OVER INTERNET PROTOCOL CALL AND RELATED DEVICE

(71) Applicant: ACER INCORPORATED, New Taipei (TW)

(72) Inventor: Geng-Bao Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 464 days.

(21) Appl. No.: 16/575,381

(22) Filed: Sep. 18, 2019

(65) Prior Publication Data

US 2020/0313901 A1    Oct. 1, 2020

(30) Foreign Application Priority Data

Mar. 26, 2019   (TW) .................................. 108110373

(51) Int. Cl.
*H04L 9/40* (2022.01)
*H04L 9/32* (2006.01)
(Continued)

(52) U.S. Cl.
CPC .......... *H04L 9/3247* (2013.01); *H04L 9/3231* (2013.01); *H04L 65/1104* (2022.05);
(Continued)

(58) Field of Classification Search
CPC ................ H04L 9/3247; H04L 9/3231; H04L 29/06095; H04L 65/1006; H04L 2209/38; H04M 1/2535
See application file for complete search history.

(56) References Cited

U.S. PATENT DOCUMENTS 7,237,114 B1 * 6/2007 Rosenberg .......... G06F 21/6209
                                                                705/67
9,002,018 B2   4/2015 Wilkins
(Continued)

FOREIGN PATENT DOCUMENTS

CN    101626294 A    1/2010
CN    108370318 A    8/2018
(Continued)

OTHER PUBLICATIONS

Elie F. Kfoury et al., Secure End-to-End VoLTE based on Ethereum Blockchain, IEEE, TSP 2018, pp. 128-132, XP033389753.

*Primary Examiner* — Ghodrat Jamshidi
(74) *Attorney, Agent, or Firm* — Winston Hsu

(57) ABSTRACT

A method of identity authentication for VoIP call, used for a first communication device supporting SIP and blockchain transmission technology, the method comprising: requesting an identity signature from a second communication device during a SIP call establishment, receiving the identity signature transmitted by the second communication device, wherein the identity signature is generated by the second communication device according to a private key, querying a public key corresponding to the identity signature from a blockchain server, utilizing the public key to verify the identity signature when obtaining the public key from the blockchain server, so as to generate a verification result, and determining to continue or terminate the SIP call establishment based on the verification result.

21 Claims, 7 Drawing Sheets

(51) Int. Cl.
*H04M 1/253* (2006.01)
*H04L 65/1104* (2022.01)
*H04L 69/16* (2022.01)
*H04L 9/00* (2022.01)

(52) U.S. Cl.
CPC .......... *H04L 69/16* (2013.01); *H04M 1/2535* (2013.01); *H04L 9/50* (2022.05)

(56) References Cited

U.S. PATENT DOCUMENTS

| | | | | |
|---|---|---|---|---|
| 9,754,299 | B2 * | 9/2017 | Cheng | G06Q 30/06 |
| 9,948,467 | B2 | 4/2018 | King | |
| 10,715,311 | B2 * | 7/2020 | Sundaresan | H04L 9/3226 |
| 2002/0032865 | A1 * | 3/2002 | Golubchik | H04L 9/3297 |
| | | | | 713/178 |
| 2003/0217165 | A1 * | 11/2003 | Buch | H04L 65/1006 |
| | | | | 709/229 |
| 2006/0262916 | A1 * | 11/2006 | Marascio | H04L 65/1043 |
| | | | | 370/352 |
| 2007/0101144 | A1 * | 5/2007 | Owen | H04L 65/1069 |
| | | | | 713/176 |
| 2007/0276925 | A1 * | 11/2007 | La Joie | H04L 65/4076 |
| | | | | 709/219 |
| 2010/0097993 | A1 * | 4/2010 | Hirano | H04W 8/082 |
| | | | | 370/328 |
| 2010/0146061 | A1 * | 6/2010 | Mattsson | H01L 31/103 |
| | | | | 709/206 |
| 2012/0144198 | A1 * | 6/2012 | Har | H04L 9/14 |
| | | | | 713/170 |
| 2019/0096021 | A1 * | 3/2019 | Jarvis | G06Q 20/4014 |
| 2019/0311107 | A1 * | 10/2019 | Kim | H04M 3/436 |
| 2019/0364025 | A1 * | 11/2019 | Binsztok | H04W 4/14 |
| 2020/0084042 | A1 * | 3/2020 | Nelson | H04L 9/3247 |
| 2020/0220725 | A1 * | 7/2020 | Hudson | H04W 12/06 |
| 2020/0234278 | A1 * | 7/2020 | Monica | G06K 19/06112 |

FOREIGN PATENT DOCUMENTS

| | | |
|---|---|---|
| CN | 108566275 A | 9/2018 |
| CN | 108985765 A | 12/2018 |
| CN | 109150542 A | 1/2019 |
| CN | 113472521 A | 10/2021 |
| WO | 2017/011601 A1 | 1/2017 |

* cited by examiner

METHOD OF IDENTITY AUTHENTICATION FOR VOICE OVER INTERNET PROTOCOL CALL AND RELATED DEVICE

BACKGROUND OF THE INVENTION

1. Field of the Invention

The present invention relates to a method of identity authentication for voice over internet protocol call and related device, and more particularly, to a method of identity authentication for voice over internet protocol call based on blockchain transmission telephony and related device.

2. Description of the Prior Art

The session initiation protocol (SIP) is a network communication protocol that is a mainstream protocol in Voice over Internet Protocol (VoIP) call. In the SIP call establishment, six kinds of messages are defined in the agreement of SIP: REGISTER, INVITE, ACK, CANCEL, BYE, and OPTIONS. Please refer to FIG. 1, which is a schematic diagram of a conventional SIP call establishment. When the caller wants to establish a session, the caller transmits the INVITE message to the callee, and the session stream is started until the acknowledgement message is transmitted.

In most situations, the caller does not know the current IP address of the callee. Thus, the caller requests the proxy server to forward message to the callee, where the proxy server stores the registration information of users and the corresponding IP address for routing the message. As shown in FIG. 2, the caller transmits the INVITE message to the proxy server, and then the proxy server transmits the INVITE message to the callee, to establish the session. As abovementioned, under the framework of the SIP agreement, the session between the caller and the callee is relied on the service provider and the server of the VoIP call. However, if the server is hacked, or if the user's account password is let out, etc., the caller or the callee may not actually be their own.

SUMMARY OF THE INVENTION

It is therefore an objective to provide a method of identity authentication for a VoIP call and related device to solve the above problem.

The present invention discloses a method of identity authentication for a VoIP call, used in a first communication device supporting session initiation protocol, SIP, and blockchain transmission technology. The method comprises requesting an identity signature from a second communication device during a SIP call establishment, receiving the identity signature transmitted by the second communication device, wherein the identity signature is generated by the second communication device according to a private key, querying a public key corresponding to the identity signature from a blockchain server, utilizing the public key to verify the identity signature when obtaining the public key from the blockchain server, to generate a verification result, and determining to continue or terminate the SIP call establishment based on the verification result.

The present invention discloses a first communication device for identity authentication. The first communication device supports session initiation protocol, SIP, and blockchain transmission technology and comprises a processing unit, for executing a program code, and a storage unit, coupled to the processing unit, for storing the program code, wherein the program code instructs the processing unit to perform the following steps: requesting an identity signature from a second communication device during a SIP call establishment, receiving the identity signature transmitted by the second communication device, wherein the identity signature is generated by the second communication device according to a private key, querying a public key corresponding to the identity signature from a blockchain server, utilizing the public key to verify the identity signature when obtaining the public key from the blockchain server, to generate a verification result, and determining to continue or terminate the SIP call establishment based on the verification result.

The present invention discloses a first communication device for identity authentication. The first communication device comprises a session initiation protocol, SIP, unit for performing a SIP call establishment with a second communication device, an identity signature requesting unit, for requesting an identity signature from the second communication device during a SIP call establishment and for receiving the identity signature transmitted from the second communication device, wherein the identity signature is generated by the second communication device according to a private key, a blockchain transmission unit, for querying a public key corresponding to the identity signature from a blockchain server, wherein the blockchain server stores a blockchain data, and an identity signature authentication unit, for utilizing the public key to verify the identity signature when obtaining the public key from the blockchain transmission unit, to generate a verification result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
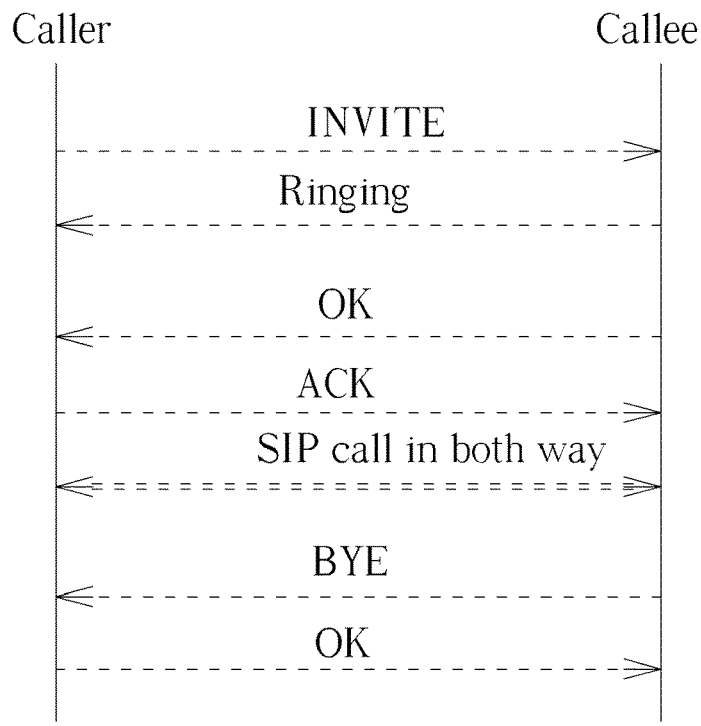
FIGS. 1-2 are schematic diagrams of a SIP call establishment according to the prior art.
Figure 2:
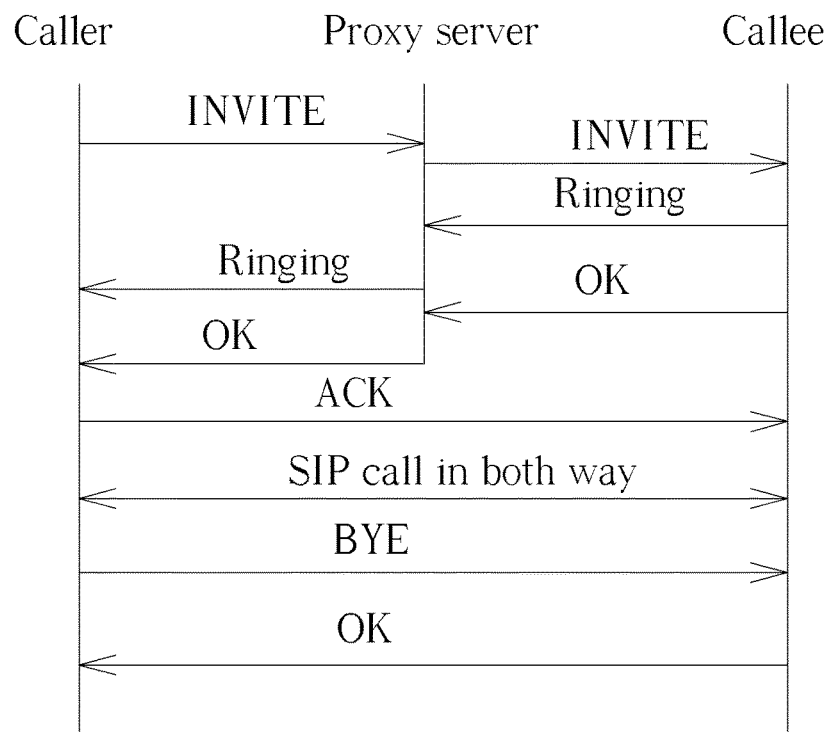
Figure 3:
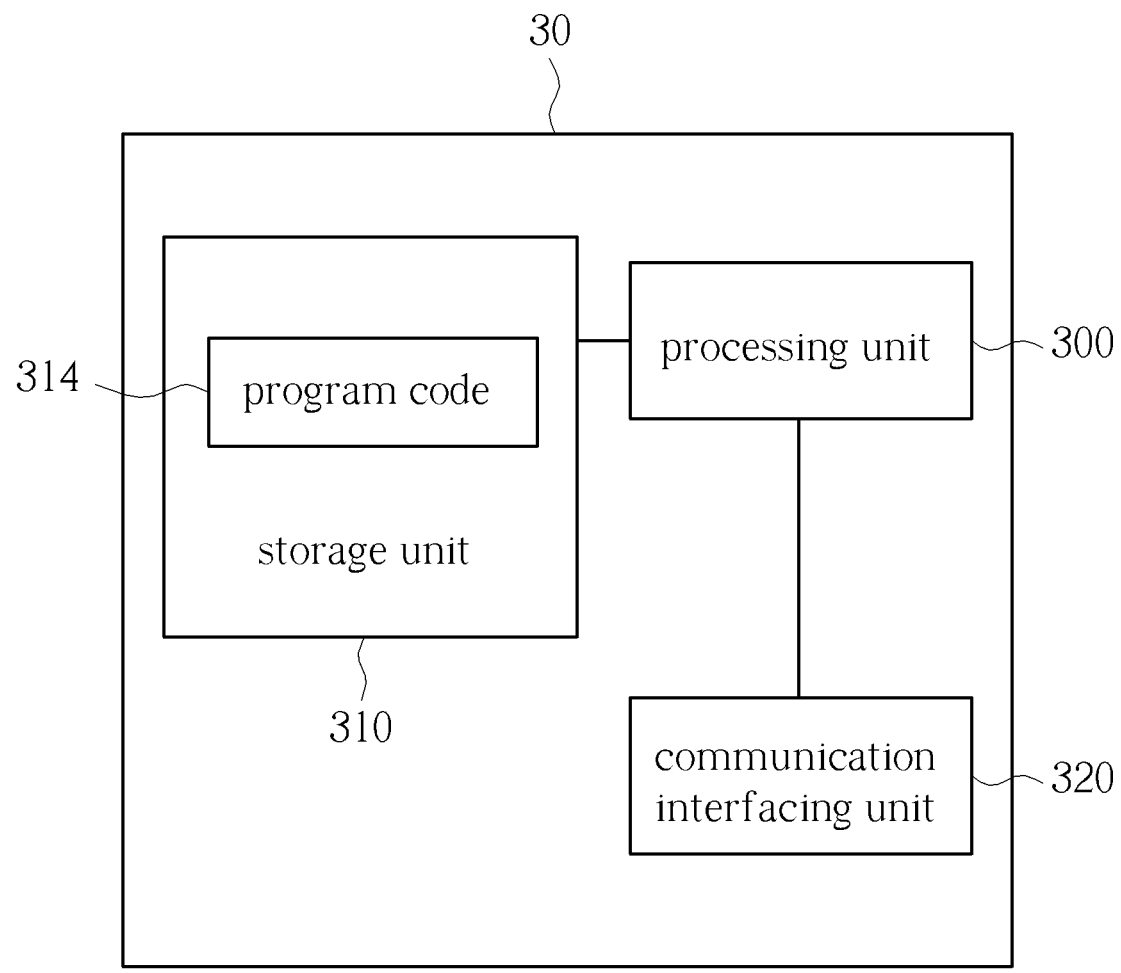
FIG. 3 is a schematic diagram of a communication device according to an embodiment of the present disclosure.

FIG. 3 is a schematic diagram of the communication device 30 according to one embodiment of the present disclosure. The communication device 100 may be the caller, the callee or the proxy server of FIGS. 1-2, and includes a processing unit 300, such as a microprocessor or Application Specific Integrated Circuit (ASIC), a storage unit 310 and a communication interfacing unit 320. The storage unit 310 may be any data storage device that can store a program code 314, for access by the processing unit 300. Examples of the storage unit 310 include but are not limited to a subscriber identity module (SIM), read-only memory (ROM), flash memory, random-access memory (RAM), CD-ROMs, magnetic tape, hard disk, and optical data storage device. The communication interfacing unit 320 could be a wireless transceiver for exchange signals with other communication devices.

The communication device 30 of the session initiation protocol (SIP) supports blockchain, asymmetric cryptography and digital signature technologies. The asymmetric cryptography is known as public and private key encryption, where public key encrypted content is decrypted only with private key and private key encrypted content is decrypted only with public key. The digital signature is an application of the public and private key encryption, for verifying a file is indeed sent from the originator. Therefore, the present invention employs the digital signature technique to verify the identity of both parties during the SIP call. In a word, the digital signature encrypts the file with the sender's private key, and the recipient decrypts the file with the sender's public key. In a scenario, the file sent by the digital signature carries plaintext data for the recipient to verify the contents of the file, but if the content of the file is fixed or predictable, the file may not carry the plaintext data.

The blockchain is a decentralized database including a group of client nodes, where anyone can query data of the blockchain through a public interface. That is, the blockchain data is transparent. The blockchain includes the feature that the blockchain data is "unable to modify". Once a piece of data is written in the blockchain, it cannot be modified. As long as the data is verified, it is permanently written into the blockchain. In addition, the blockchain data of each client node is the same, and thus if the blockchain data is tampered, it is easily found.

Note that, the SIP call relies on a trusted third party (such as a proxy server) for authentication and mediation, which may cause security problems during the data transmission of the SIP call, such as disguised server or tamper-evident packet. As abovementioned, the blockchain is a decentralized distribution database, which weakens the dependence on the third parties. Therefore, identity authentication mechanism for SIP call based on the blockchain can enhance the security of network calls. In detail, the decentralization character of the blockchain makes difficult of attacking a specific server, and the un-modification character of the blockchain also makes difficult for the attacker to tamper with the blockchain data. Thus, the present invention provides the concept of recording the public key with blockchain. Since the communication device 30 obtains the public key from the blockchain by itself, instead of through data transmission of the SIP call, it is difficult for the hacker to attack by means of the fake digital signature and the public key. Therefore, the present invention can realize the identity authentication of the SIP call and strengthen the security of data transmission of the SIP call.

Figure 4:
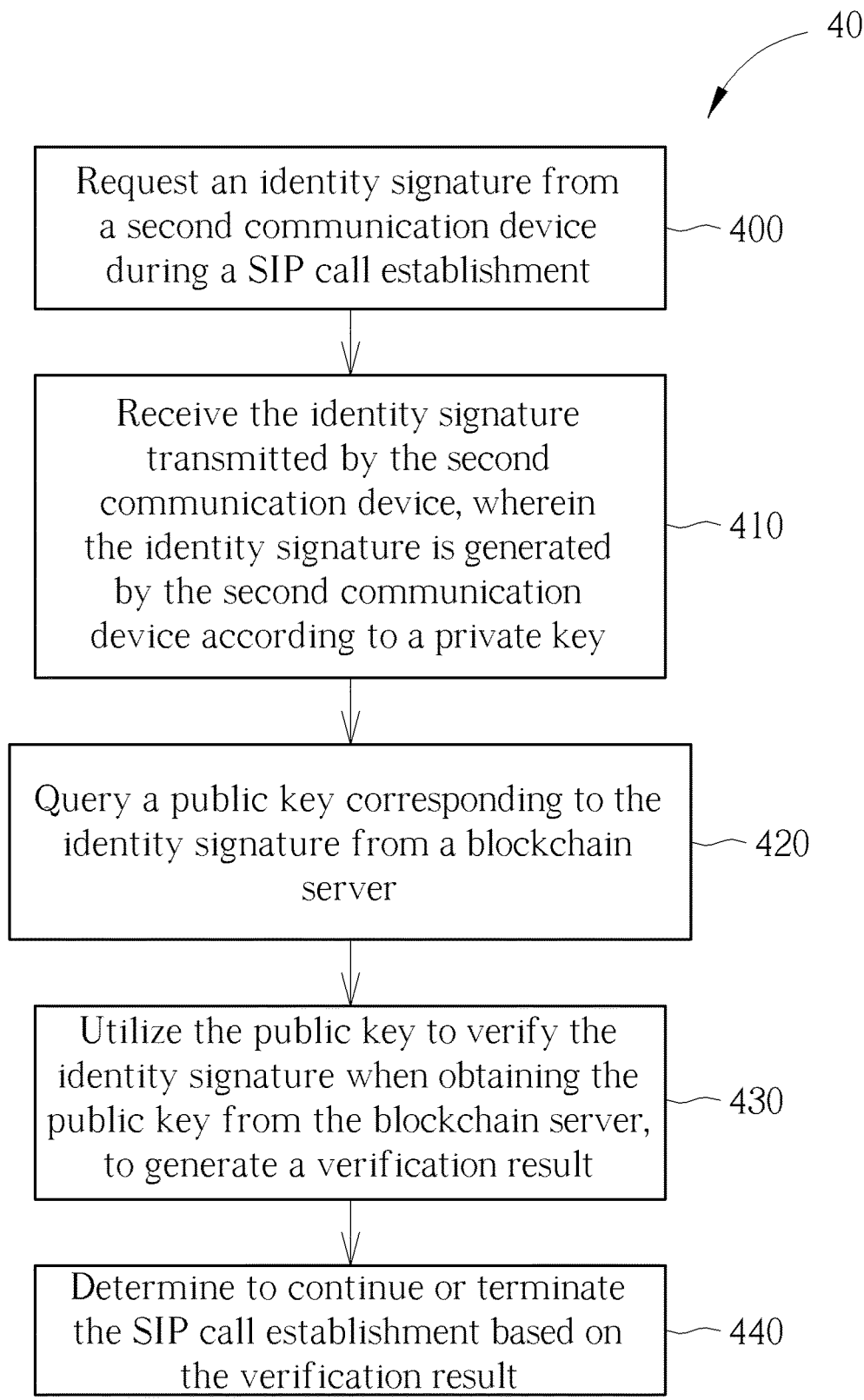
FIG. 4 is a flowchart of an identity authentication for a VoIP call according to an embodiment of the present disclosure.

Reference is made to FIG. 4. A flowchart of the identity authentication process 40 is illustrated. The identity authentication process 40 could be utilized in the communication device 30 (hereafter called the first communication device), may be compiled into a program code 314, and may include the following steps:

Step 400: Request an identity signature from a second communication device during a SIP call establishment.

Step 410: Receive the identity signature transmitted by the second communication device, wherein the identity signature is generated by the second communication device according to a private key.

Step 420: Query a public key corresponding to the identity signature from a blockchain server.

Step 430: Utilize the public key to verify the identity signature when obtaining the public key from the blockchain server, to generate a verification result.

Step 440: Determine to continue or terminate the SIP call establishment based on the verification result.

According to the identity authentication process 40, when the first communication device transmits or receives the INVITE message during the SIP call establishment (hereafter called SIP call), the first communication device requests the second communication device to transmit the identity signature via the message encrypted with the private key. When the first communication device receives the identity signature from the second communication device, the first communication device inquiries the public key corresponding to the identity signature via the blockchain, to verify the identification of the second communication device, so as to determine to continue or cancel the SIP call. For example, the first communication device utilizes the public key to decrypt the identity signature transmitted from the second communication device when the first communication device obtains the public key via the blockchain. If the identity signature is successfully decrypted with the public key, the identification of the second communication device is thereof confirmed, so that the first communication device continue the SIP call with the second communication device. For example, the first communication device transmits the ACK message to the second communication device, to complete the SIP call establishment. On the other hand, if the identity signature is not successfully decrypted with the public key, the first communication device cancels or terminates the SIP call. For example, the first communication device transmits CANCEL or BYE message to the second communication device. In addition, when the first communication device does not obtain the public key via the blockchain, the first communication device cancels or terminates the SIP call.

Moreover, the first communication device request the second communication device of the identity signature by transmitting a request message of the SIP or hypertext transfer protocol (HTTP) to the second communication device. The request message is used for indicating the second communication device to transmit the identity signature to the first communication device. In an embodiment, the request message could be the INVITE message of the ACK message of the SIP.

In other words, the present invention proposes that the blockchain pre-stores the public key of the communication device, wherein the public key could be uploaded to the blockchain by the communication device or a host/server for account management. Meanwhile, the private key is preserved by the communication device to encrypt the identity signature, and therefore the other communication device could obtains the public key via the blockchain for decrypt the identity signature to verify the identity of the communication device.

Figure 5:
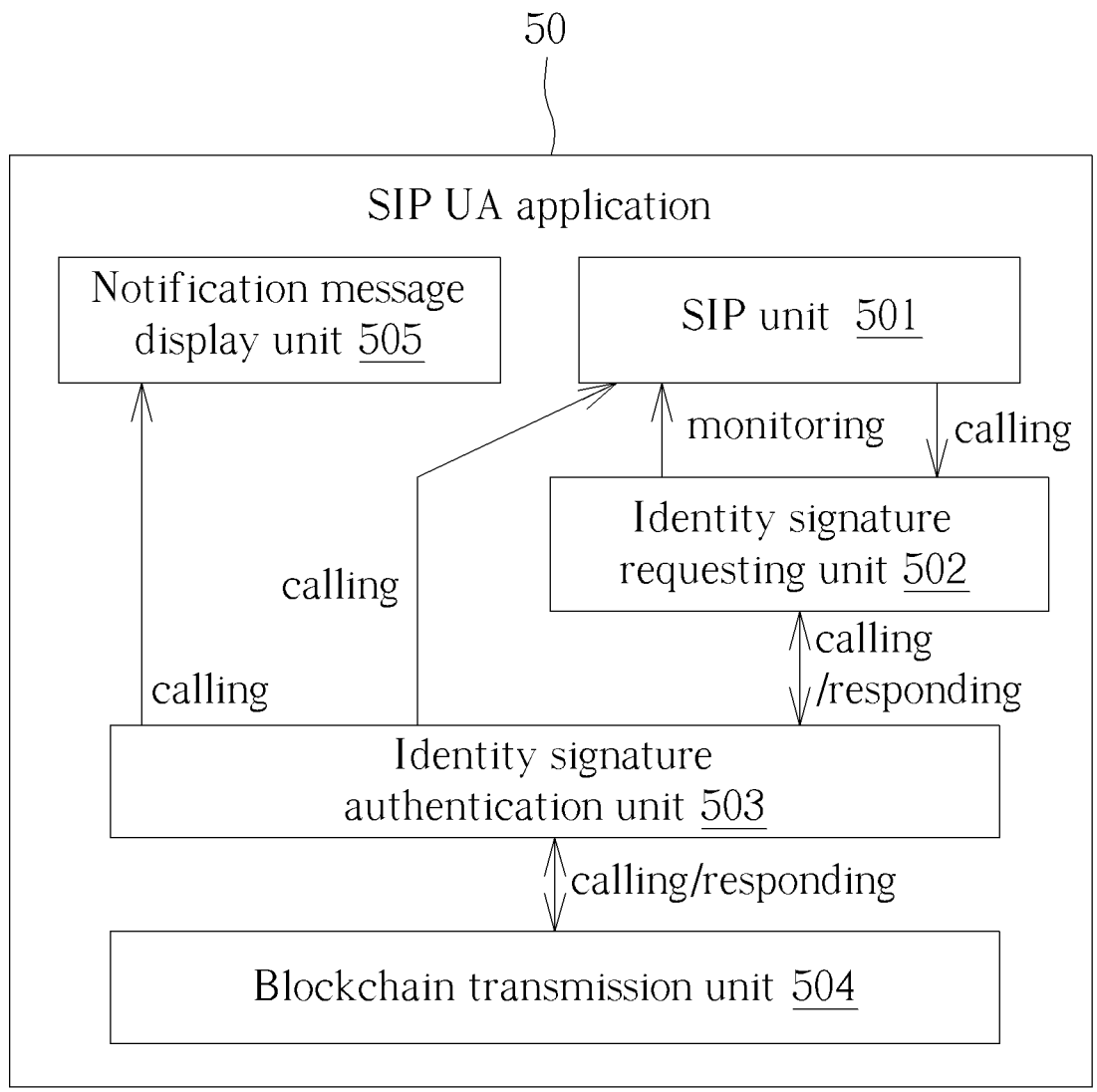
FIG. 5 is a schematic diagram of a communication device according to an embodiment of the present disclosure.

FIG. 5 is a schematic diagram of the communication device 50 according to an embodiment of the present disclosure. The communication device 50 includes the SIP unit 501, the identity signature requesting unit 502, the identity signature authentication unit 503, the blockchain transmission unit 504 and the notification message display unit 505. The SIP unit 501 is used for performing a SIP call with the other communication device, and indicating the identity signature requesting unit 502 to request the other communication device of the identity signature. However, in an embodiment, the identity signature requesting unit 502 could monitor the SIP unit 501, and determine to request the identity signature from the other communication device accordingly. The blockchain transmission unit 504 is used for querying the public key corresponding to the identity signature from the blockchain server, wherein the blockchain server stores complete blockchain data that can be retrieved and synchronized, such as the Full Node as a blockchain node or stores only lightweight data (e.g. a header of the blockchain with simple transaction verification), such as the Lightweight Client as a blockchain node. The identity signature authentication unit 503 is used for utilizing the public key to verify the identity signature when obtaining the public key from the blockchain transmission unit 504, to generate a verification result. In addition, the identity signature authentication unit 503 indicates the SIP unit 501 to continue the SIP call or cancel/terminate the SIP call according to the verification result. For example, the identity signature authentication unit 503 indicates the SIP unit 501 to continue the SIP call when the verification result is success. On the other hand, the identity signature authentication unit 503 indicates the SIP unit 501 to cancel/terminate the SIP call when the verification result is failure, and indicates the notification message display unit 505 to display a notification message to the user.

Figure 6:
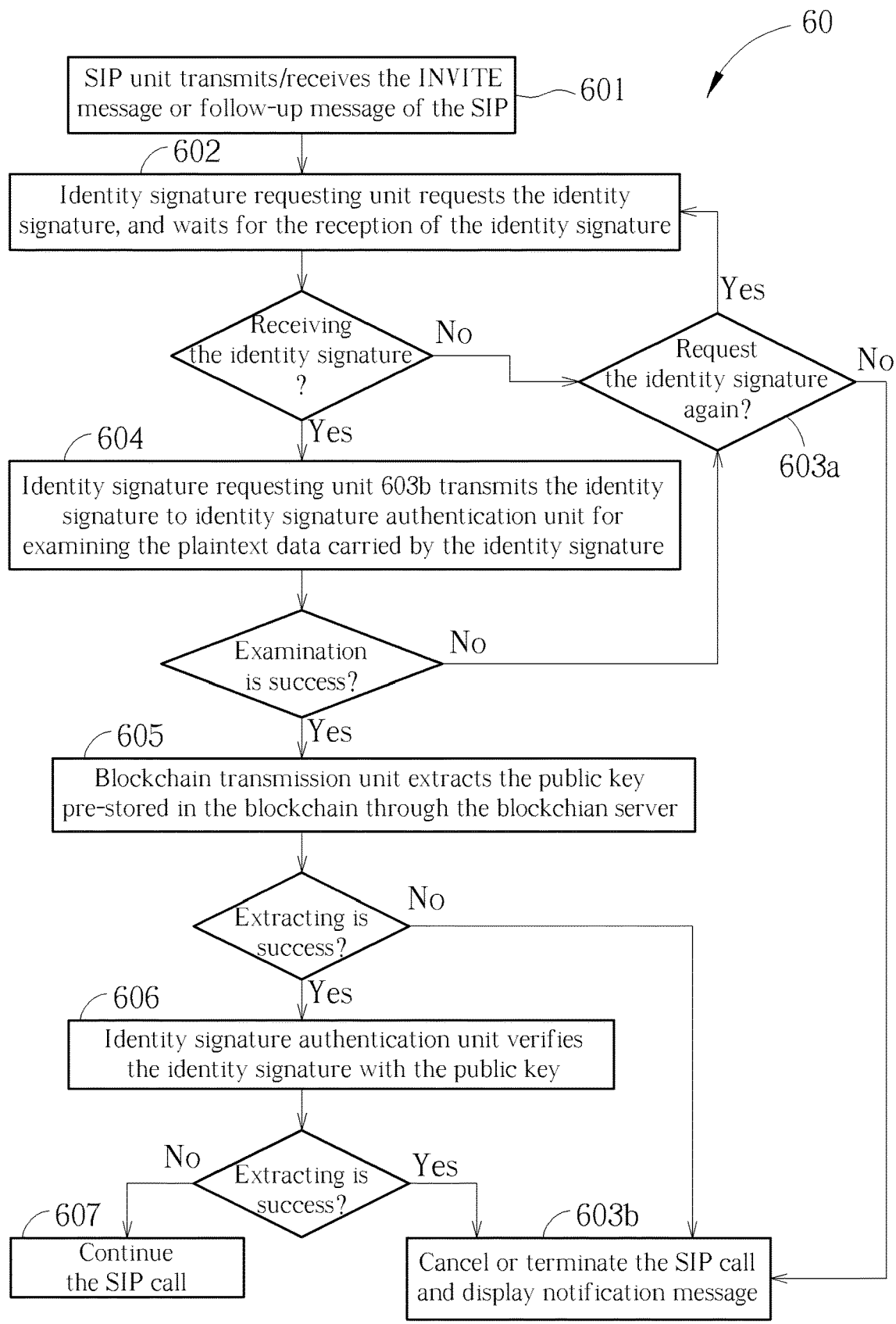
FIG. 6 is a flowchart of an identity authentication for a VoIP call according to an embodiment of the present disclosure.

The operation of the communication device 50 (hereafter called the first communication device) could be summarized as identity authentication process 60 for SIP call/VoIP. As shown in FIG. 6, the SIP unit of the first communication device transmits/receives the INVITE message or follow-up message of the SIP (step 601), and then the identity signature requesting unit requests the identity signature from the second communication device, and waits for the reception of the identity signature (step 602). If the identity signature requesting unit does not receive the identity signature, the identity signature requesting unit could request the identity signature from the second communication device again (step 603a), or indicates the SIP unit to cancel/terminate the SIP call. Moreover, the identity signature requesting unit may indicate the notification message display unit to display a notification message (step 603). On the other hand, if the identity signature requesting unit receives the identity signature, the identity signature requesting unit transmits the identity signature to the identity signature authentication unit, so as to examine the plaintext data carried by the identity signature (step 604). In detail, the identity signature authentication unit determines whether the plaintext data is conformed to a predetermined plaintext pattern. However, if the identity signature does not carry the plaintext data, the examining step could be omitted. The identity signature authentication unit determines that the examination is success when the plaintext data is conformed to the predetermined plaintext pattern, and indicates the blockchain transmission unit to extract the public key pre-stored in the blockchain through the blockchain server (step 605). On the other hand, the identity signature authentication unit determines that the examination is failed when the plaintext data is not conformed to the predetermined plaintext pattern, and indicates the identity signature requesting unit to request the identity signature from the second communication device (step 603a), or directly indicates the SIP unit to cancel/terminate the SIP call and indicates the notification message display unit to display the notification message (step 603b).

When the blockchain transmission unit extracts the public key from the block chain server, the blockchain transmission unit transmits the public key to the identity signature authentication unit, so that the identity signature authentication unit could verify or decrypt the identity signature (step 606). In an embodiment, if the identity signature is successfully decrypted, and the content of the decrypted identity signature is conformed to the predetermined format/rule, the identity signature authentication unit indicates the SIP unit to continue the SIP call (step 607). If the identity signature is not successfully decrypted, or the identity signature is successfully decrypted but the content of the decrypted identity signature is not conformed to the predetermined format/rule, the identity signature authentication unit indicates the SIP unit to cancel/terminate the SIP call and indicates the notification message display unit to display the notification message (step 603b). On the other hand, the blockchain transmission unit indicates the SIP unit to cancel/terminate the SIP call when the blockchain transmission unit does not extract public key from the blockchain server, and further indicates the notification message display unit to display the notification message (step 603b).

In an embodiment, the predetermined format includes at least one of a target address, a source address, time and a session identity. In addition, the predetermined format/rule is included in plaintext data carried by the identity signature. For example, the identity signature authentication unit utilizes the extracted public key to decrypt the identity signature, and obtains the following content:
From: 7933@voip.acer.com
To: 0001@voip.acer.com
Time: 1528037983
InviteId: 123456789

When the identity signature is conformed to the predetermined format of the communication device, the communication device determines the identity signature is successfully verified and continues the SIP call. Otherwise, the communication device determines the identity signature verification is failed, and thus cancels or terminates the SIP call.

Note that, the identity authentication process 60 could be triggered by INVITE message or follow-up message, such as ACK message or other messages. If the identity authentication process 60 is performed during the transmission/reception of the INVITE message, the identity authentication process 60 is further used for verifying the identification of the proxy server. However, if the identity authentication process 60 is performed during the transmission/reception of the ACK message, the identity authentication process 60 is only used for verifying the identification of the other communication device, namely the second communication device. The initiation of the identity authentication process 60 can be determined by the application of the first communication device.

Note that, the communication devices (i.e. caller, callee, and proxy server) participated in the SIP call can request each other to send the identity signature, which is sent by the other communication device with the stored private key. Meanwhile, the public key corresponding to the private key is recorded on the blockchain.

Figure 7:
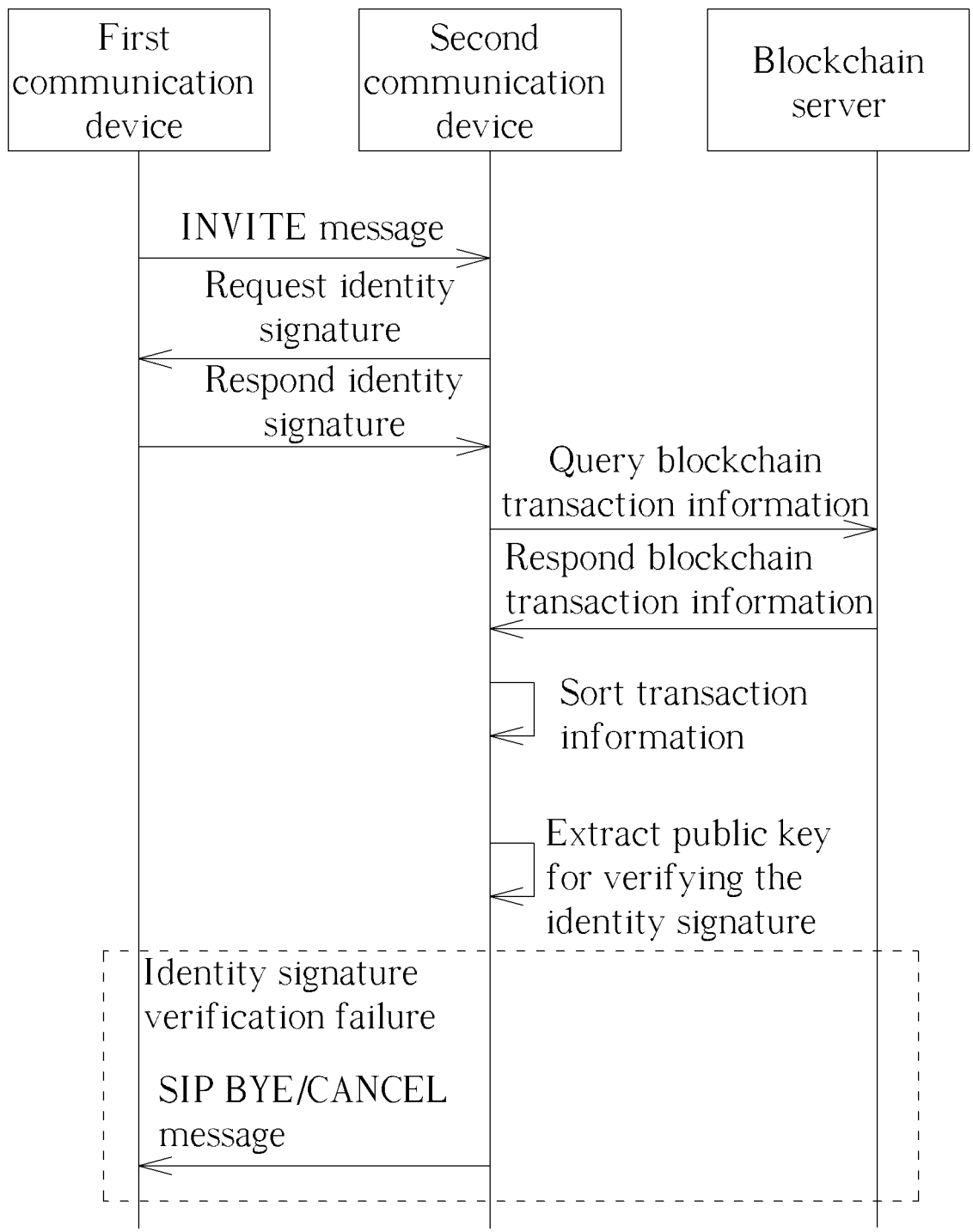
FIGS. 7-8 are schematic diagrams of a message sequence of an identity authentication for a VoIP call according to an embodiment of the present disclosure.
Figure 8:
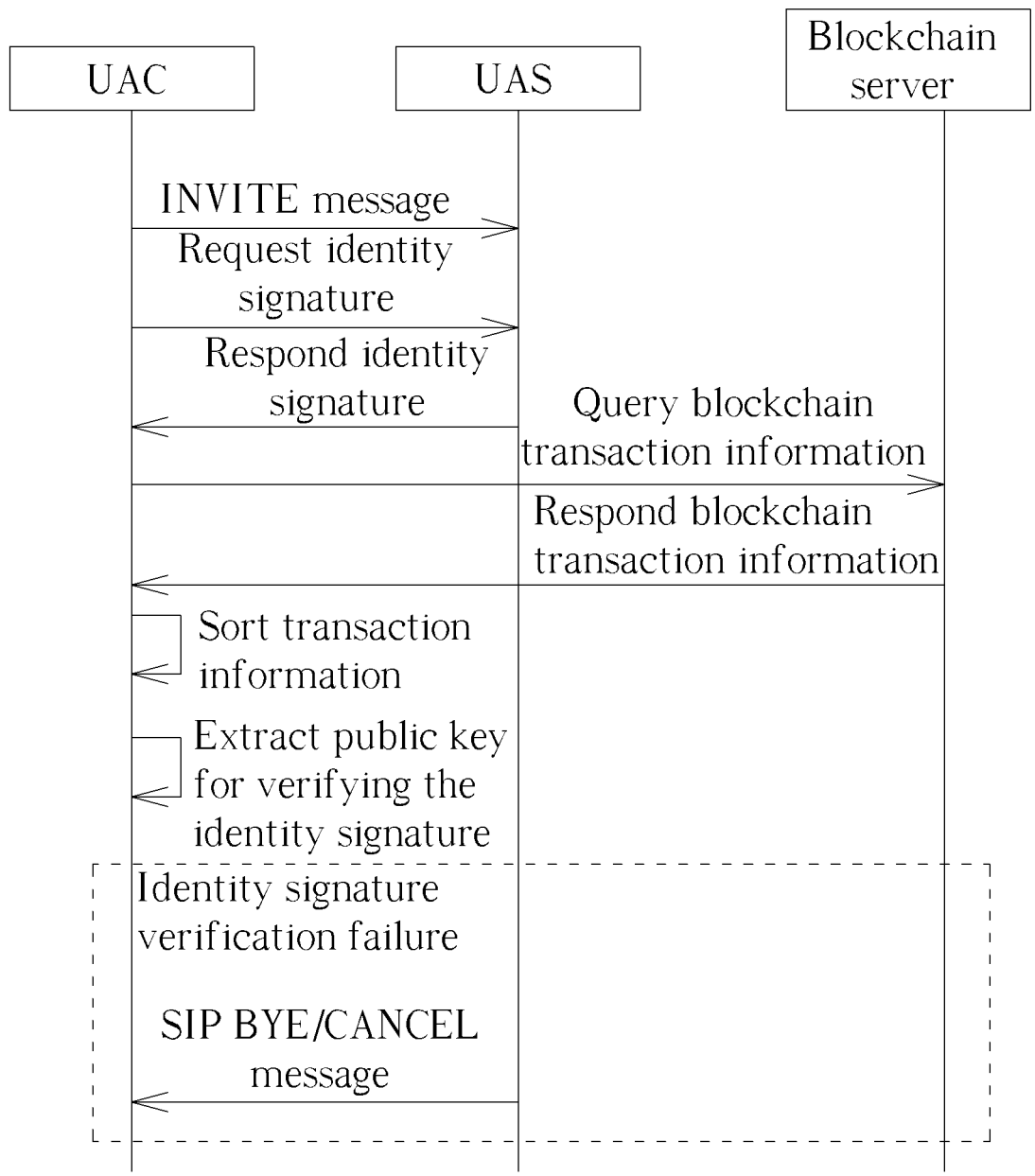

In detail, the blockchain transmission unit queries the public key pre-stored in the blockchain of the blockchain server. Reference is made to FIGS. 7-8, which are schematic diagrams of a message sequence of an identity authentication process according to an embodiment of the present disclosure. In FIG. 7, the first communication device transmits the INVITE message to the second communication device, and then the second communication device requests the identity signature from the first communication device and receives the identity signature. In addition, the second communication device transmits the query message for "querying blockchain transaction information" to the blockchain server, so the blockchain server transmits the response message for "responding blockchain transaction information" to the second communication device. By the response message, the second communication device queries the transaction information and sorts out the public key. The way of extracting the public key is not limited herein.

In addition, after the public key is extracted, the second communication device uses this public key to verify the identity signature. Assume that the identity signature verification is failed, the second communication device transmits the BYE message or CANCEL message to the first communication device to immediately terminate the SIP call, and may display a warning message by means of a user interface or plaintext to inform the user of the identity signature verification failed.

In an embodiment, the method of recording public key in the blockchain could be applied to a scenario of bitcoin transaction, whereby the public key is read from the blockchain, to verify the identity of the bitcoin trader.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 30.

In conclusion, the present invention addresses to operations of the SIP call, where public key is record in blockchain for identity authentication. In detail, the communication device reads public key from the blockchain to decrypt the identity signature, so as to confirm the identification of the other communication device. Note that, with applying the character of the blockchain in identity authentication of VoIP, the security for SIP call can be enhanced, which ensures the quality and trust of SIP call between the communication devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of identity authentication for a VoIP call, used in a first communication device supporting session initiation protocol, SIP, and blockchain transmission technology, the method comprising:
   requesting an identity signature from a second communication device during a SIP call establishment;
   the first communication device receiving the identity signature transmitted by the second communication device, wherein the identity signature of the second communication device is generated by the second communication device according to a private key of the second communication device, and the second communication device is a proxy server or a callee;
   querying a public key corresponding to the identity signature of the second communication device from a blockchain server;
   utilizing the public key to verify the identity signature when obtaining the public key from the blockchain server, to generate a verification result; and
   determining to continue or terminate the SIP call establishment based on the verification result.

2. The method of claim 1, further comprising:
   terminating or cancelling the SIP call establishment when not obtaining the public key from the blockchain server.

3. The method of claim 2, further comprising:
   indicating a notification message to a user when terminating the SIP call establishment.

4. The method of claim 1, wherein the step of utilizing the public key to verify the identity signature when obtaining the public key from the blockchain server, to generate the verification result comprises:
   utilizing the public key to decrypt the identity signature;
   determining the verification result is success when the identity signature is successfully decrypted and the decrypted identity signature is conformed to a predetermined rule; and
   determining the verification result is failure when the identity signature is not successfully decrypted or when the identity signature is successfully decrypted but the decrypted identity signature is not conformed to the predetermined rule.

5. The method of claim 4, wherein the step of determining to continue or terminate the SIP call establishment based on the verification result comprises:
   continuing the SIP call establishment when the verification result is success; and
   terminating the SIP call establishment when the verification result is failure.

6. The method of claim 5, further comprising:
   indicating a notification message to a user when terminating the SIP call establishment.

7. The method of claim 4, wherein the predetermined rule is a predetermined format of the identity signature, the predetermined format includes at least one of a target address, a source address, time and a session identity, and the predetermined rule is included in plaintext data carried by the identity signature transmitted from the second communication device.

8. The method of claim 7, further comprising:
   examining the plaintext data carried by the identity signature, wherein the examining step comprises:
   determining whether the plaintext data is conformed to a predetermined plaintext pattern; and
   requesting the second communication device to transmit the identity signature or terminating the SIP call establishment when the plaintext data is not conformed to the predetermined plaintext pattern.

9. The method of claim 8, wherein the step of querying the public key corresponding to the identity signature from the blockchain server comprises:
   querying the public key corresponding to the identity signature from the blockchain server when the plaintext data is conformed to the predetermined plaintext pattern.

10. The method of claim 1, wherein requesting the identity signature from the second communication device during the SIP call establishment comprises:
    transmitting a request message of the SIP or hypertext transfer protocol, HTTP, to the second communication device, wherein the request message is used for indicating the second communication device to transmit the identity signature to the first communication device.

11. The method of claim 10, wherein the request message is an invite message or an acknowledgement message of the SIP.

12. The method of claim 1, wherein the identity signature transmitted by the second communication device includes a plaintext data, and the method further comprises examining the plaintext data, wherein the examining step comprises:
- determining whether the plaintext data is conformed to a predetermined plaintext pattern; and
- requesting the second communication device to transmit the identity signature or terminating the SIP call establishment when the plaintext data is not conformed to the predetermined plaintext pattern.

13. The method of claim 1, wherein the step of querying the public key corresponding to the identity signature from the blockchain server comprises:
- transmitting a query message to the blockchain server;
- receiving a response message including a blockchain data from the blockchain server; and
- sorting the public key from the blockchain data.

14. A first communication device for identity authentication, the first communication device supporting session initiation protocol, SIP, and blockchain transmission technology and comprising:
- a microprocessor, for executing a program code; and
- a storage unit, coupled to the microprocessor, for storing the program code, wherein the program code instructs the microprocessor to perform the following steps:
  - requesting an identity signature from a second communication device during a SIP call establishment;
  - the first communication device receiving the identity signature transmitted by the second communication device, wherein the identity signature of the second communication device is generated by the second communication device according to a private key of the second communication device, and the second communication device is a proxy server or a callee;
  - querying a public key corresponding to the identity signature of the second communication device from a blockchain server;
  - utilizing the public key to verify the identity signature when obtaining the public key from the blockchain server, to generate a verification result; and
  - determining to continue or terminate the SIP call establishment based on the verification result.

15. The first communication device of claim 14, wherein the program code further instructs the microprocessor to perform the following steps:
- terminating or cancelling the SIP call establishment when not obtaining the public key from the blockchain server.

16. The first communication device of claim 15, wherein the program code further instructs the microprocessor to perform the following steps:
- indicating a notification message to a user when terminating the SIP call establishment.

17. The first communication device of claim 14, wherein the program code further instructs the microprocessor to perform the following steps:
- utilizing the public key to decrypt the identity signature;
- determining the verification result is success when the identity signature is successfully decrypted and the decrypted identity signature is conformed to a predetermined rule; and
- determining the verification result is failure when the identity signature is not successfully decrypted or when the identity signature is successfully decrypted but the decrypted identity signature is not conformed to the predetermined rule.

18. The first communication device of claim 17, wherein the program code further instructs the microprocessor to perform the following steps:
- continuing the SIP call establishment when the verification result is success; and
- terminating the SIP call establishment when the verification result is failure.

19. The first communication device of claim 18, wherein the program code further instructs the microprocessor to perform the following steps:
- indicating a notification message to a user when terminating the SIP call establishment.

20. The first communication device of claim 14, wherein the program code further instructs the microprocessor to perform the following steps:
- transmitting a request message of the SIP or hypertext transfer protocol, HTTP, to the second communication device, wherein the request message is used for indicating the second communication device to transmit the identity signature to the first communication device.

21. The first communication device of claim 14, wherein the program code further instructs the microprocessor to perform the following steps:
- transmitting a query message to the blockchain server;
- receiving a response message including a blockchain data from the blockchain server; and
- sorting the public key from the blockchain data.

* * * * *